United States Patent

[11] 3,563,355

[72] Inventors Raymond E. Goodson
West Lafayette;
Dennis Dobrinich; Lindell R. Riddle, New Castle, Ind.
[21] Appl. No. 808,501
[22] Filed Mar. 19, 1969
[45] Patented Feb. 16, 1971
[73] Assignee Force Control Industries, Inc.
Fairfield, Ohio

[54] CONTROL SYSTEM FOR VARIABLE SPEED DRIVE
7 Claims, 3 Drawing Figs.
[52] U.S. Cl. .................................................. 192/104,
307/120, 318/317, 415/15, 192/58
[51] Int. Cl. .................................................. F16d 43/24
[50] Field of Search ........................................... 192/103,
104, 104 (F), 57.58 (A2), 58 (A3); 307/120;
318/317; 415/15; 310/95

[56] References Cited
UNITED STATES PATENTS
2,775,328  12/1956  Yokel ............................ 192/57
3,032,668  5/1962  Robinson et al. ............... 192/104(UX)
3,437,188  4/1969  Long ............................192/104(F)(X)

*Primary Examiner*—Allan D. Herrmann
*Attorney*—Marechal, Biebel, French and Bugg ABSTRACT: The control system for maintaining the output speed of a fluid control variable speed drive at a preselected magnitude includes an on-off control valve to supply control fluid to the drive, a tachometer to sense the output speed of the drive, circuit means for comparing the actual output speed with the desired output speed, and means for supplying current to the on-off valve to adjust the fluid to the drive so that the desired output speed is obtained. The control circuit to the on-off valve includes an oscillator, the output wave form of which is superimposed upon a DC voltage representing the difference between desired speed and actual speed. For small error signals, the on-off valve is periodically operated exclusively by that portion of the oscillator output signal which exceeds the threshold voltage of the on-off valve solenoid. The shape of the oscillator wave form may be selected to compensate for nonlinearity in the response characteristics of the variable speed drive.

Patented Feb. 16, 1971

INVENTORS
RAYMOND E. GOODSON,
DENNIS DOBRINICH &
LINDELL RAY RIDDLE

BY Marechal, Biebel, French & Bugg
ATTORNEYS

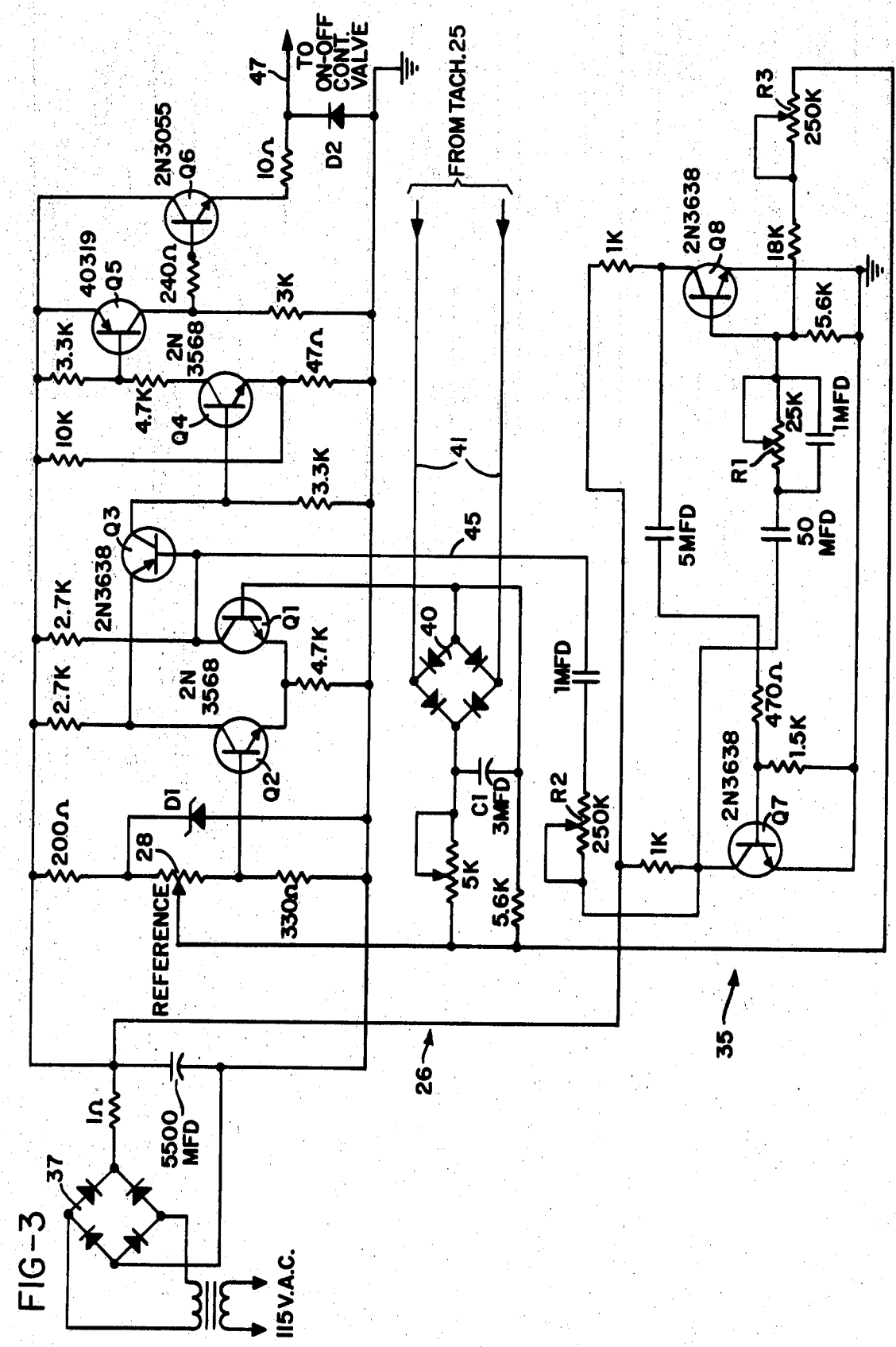

CONTROL SYSTEM FOR VARIABLE SPEED DRIVE

BACKGROUND OF THE INVENTION

The present invention relates to control systems for variable speed drives and more particularly to such drives which have low inertia loads. The particular embodiment of the invention is thus directed to the controls of variable speed drives which operate on an oil shear principle in which the series of interfitted stator and rotor plates are normally actuated by films of oil and in which the speed of the output shaft is controlled by varying the pressure loading between the interfitting plate series. Examples of such drives include drives marketed under the trademark Positrol, including a Series 200 and a Series 400 made and sold by Force Control Industries, Inc., 3660 Dixie Highway, Fairfield, Ohio, the assignee of the present invention. Another example of a fluid coupling variable speed drive to which the present invention may be applied is shown in U.S. Pat. No. 2,775,328.

Variable speed drives of the type described above are particularly useful in controlling the speed, in high horsepower installations, of low inertia loads, such as blowers, pumps, fans and the like. The fluid coupling may be controlled either pneumatically or hydraulically by either an internal or an external pump. Such units characteristically tend to have a nonlinear response rate due to certain inherent design and load factors.

While this nonlinearity does not adversely affect the performance of such variable speed drives, it does create special control problems where accuracy of control is desired, particularly where the drive is operating under a very low percentage of slip or, in other words, under conditions where the output speed of the variable speed drive nearly matches its input speed. Under such conditions, it has frequently been observed that a control system, sensing a decrease in speed, applies excessive pressure to the stack of plates causing the plates to lock up, due to relatively low percentage of slip. This condition causes an immediate overspeed with low inertia loads, with the result that the fluid pressure is removed to permit the plates to go out of lock up and into a slip condition. With high inertia loads, unacceptable or impractical power requirements may be placed upon the prime mover. Of necessity, these actions take a certain amount of time due to the inertia of the actuating piston and the moving plates and due to the necessity of reestablishing a fluid film between the plates. It can readily be seen that under conditions of low slip, the drive may hunt or oscillate between lock up and release, thus materially shortening the life of the drive and providing relatively poor speed control.

Such hunting may be substantially reduced or controlled by the use of a proportional valve in the fluid supply system for the piston. However, proportional valves are costly and are also subject to control problems and failures of their own. They are thus subject to sticking, to dirt or moisture in the air if the control is a pneumatic supply, and to dirt and oil temperature if the control is hydraulic, and thus cannot be relied upon to give consistent results in an industrial environment over an extended period of time. It is therefore highly desirable to supply a single on-off valve or a proportional valve which is operated simply in the on-off mode, to control such low inertia slip type variable speed drives.

As mentioned above, such variable speed drives inherently provide further difficulties in applying conventional proportional control. Internally, rather high flow rates in the fluid coupling region are required, which may run between 10—20 gallons per minute. The fluid coupling oil, over a period of time, varies in density and viscosity with temperature. There are also variations in cleanliness and variations due to aeration. Further, there is considerably hysteresis effect in the disc pack which is due inherently to he internal friction in the splines and keyways by reason of the transmitted torque, and thus the friction tends to increase and thus increases the hysteresis effect with increased torque. The increase in internal friction in the control system thus increases the control difficulty in regions where the error signal is small and particularly where the output speed is set substantially near that of the input speed.

SUMMARY OF THE INVENTION

The present invention overcomes the difficulties resulting from the hysteresis effect, nonlinearity, the stick-slip, and low frequency response rate of the slip-type variable speed drive by the employment of an oscillator which has an alternating current wave form applied to the DC amplifier employing a simple on-off fluid control valve in such a manner that the valve is controlled primarily by the oscillator wave form. Thus, the output of the oscillator is effectively superimposed upon the DC error signal representing the difference between a desired speed and an accurate speed.

The frequency of the oscillator is chosen so as to exceed substantially the normal cyclic response rate of the variable speed drive, but to be less than the maximum response rate of the on-off error signal, the control valve is operated periodically by that portion of the oscillator output wave form which exceeds the threshold voltage of the on-off valve. As the error voltage increases, a greater portion of the oscillator wave form will exist above this threshold and therefore the on-off valve will remain open for longer periods of time.

One of the advantages of the present concept is the fact that the wave form of the oscillator can be chosen to compliment known nonlinearities of the system. Thus, a sinusoidal output may be employed to give one desired response rate, in accordance with the magnitude of the error signal, while a highly differentiated or peaked signal may be employed to give somewhat the opposite effect. Further, it is within the scope of the invention to control the frequency of the oscillator either in accordance with the error signal or independently of it.

It is therefore an object of this invention to provide an improved control system of the type described wherein an on-off valve is employed to supply fluid pressure to a variable speed drive in such a manner that the drive may be operated under conditions of low slip, that is, where the difference between the output speed from the drive very nearly equals the input speed; and to provide a control system of the type described wherein an oscillator supplies a signal which is superimposed upon a control signal applied to the on-off control valve to actuate the valve periodically for periods of time which depend on the magnitude of the control signal and wherein the shape and/or frequency of the oscillator output may be controlled to compensate for anomalies such as nonlinearities within the variable speed drive.

Other objects and advantages of the invention will be apparent from the following description, the accompanying drawings and the appended claims.

BRIEF DESCRIPTION OF THE DRAWINGS

FIG. 3 is an electrical schematic diagram of the control circuit shown in FIG. 1.

DESCRIPTION OF THE PREFERRED EMBODIMENT

Figure 1:
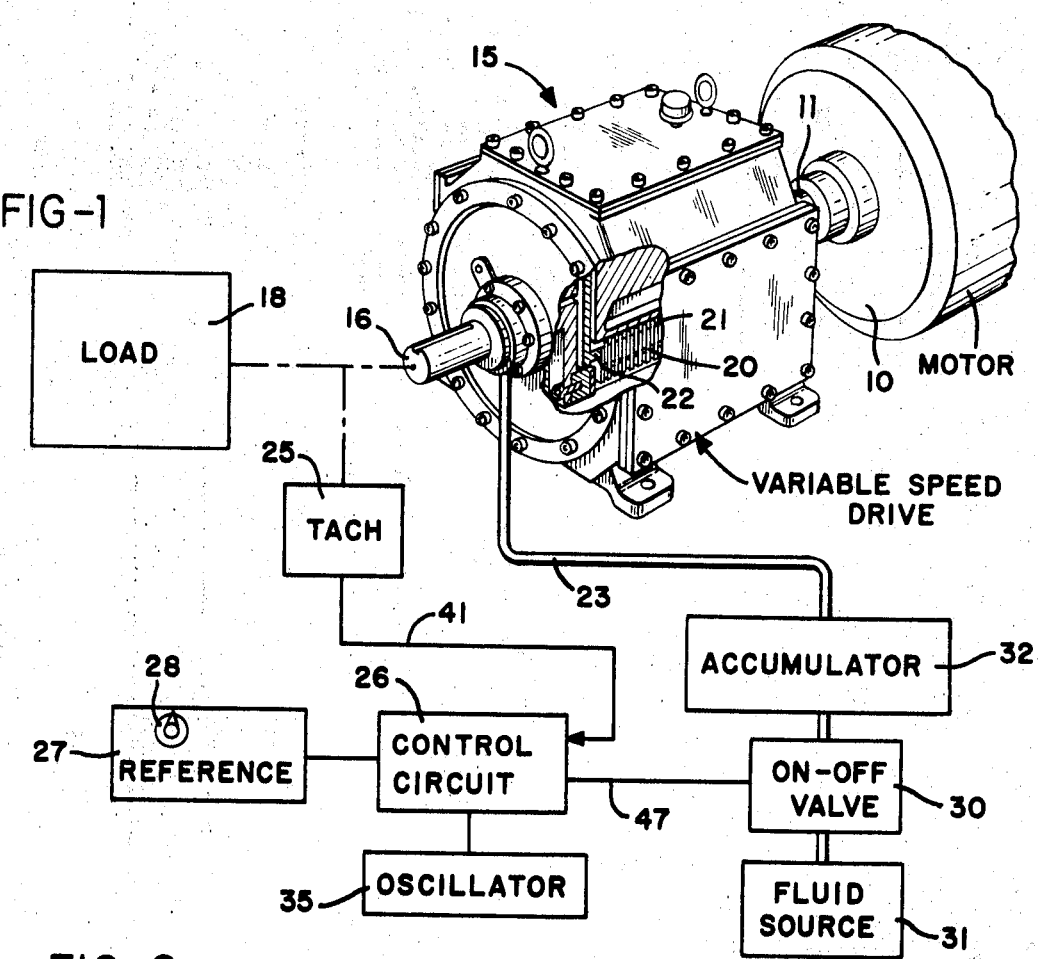
FIG. 1 is a view showing a motor and variable speed drive in pictorial form with the control system for the variable speed drive shown in block diagram form.

The control system for use with a slip type variable speed drive is shown in FIG. 1. A motor 10 rotates an input shaft 11 to the variable speed drive 15 at a constant angular velocity. The variable speed drive 15, shown in FIG. 1, is a slip type oil shear device in which power from the input shaft 11 is coupled to an output shaft 16 and then to a load 18.

The speed of the output shaft 16 is controlled by varying the pressure exerted on a fluid operated piston unit 22 in response to fluid pressure from a line 23 which determines the force acting on a series of interfitting stater and rotor plates, 20 and 21, respectively. The variable speed drive 15 may be either pneumatically or hydraulically actuated. The load 18, which may vary and cause speed changes in the output shaft, is typically a blower, pump, fan or the like.

The rotational speed of the output shaft 16 is monitored by a tachometer 25 which produces an electrical voltage which is a function of the speed of the shaft. The tachometer may be a proximity type device wherein a magnet rotating on the shaft 16 induces a voltage in a pickup located near the magnet, or may be some other well known type of voltage producing device.

The output voltage from the tachometer 25 is applied to a control circuit 26 where it is compared to a voltage supplied by a reference source 27. The magnitude of the reference voltage is determined by the setting of potentiometer 28. The difference between the tachometer output voltage and the reference voltage is a DC error voltage which is amplified in the control circuit and applied to an on-off control valve 30. Thus, the setting of potentiometer 28 is used to set the output speed of the variable speed drive 15.

The on-off valve 30 controls a source of fluid pressure 31 to the input line 23 and thus the force exerted on the interfitting plates 20. An accumulator 32 may be installed between the on-off valve 30 and the variable speed drive 15 in order to provide the equivalent of a proportional supply of fluid pressure to the drive 15.

In a pure DC control system, the on-off valve 30 would not operate until the DC voltage output from the control circuit, which is an error signal proportional to the difference between the reference voltage and the tachometer output, rises above a predetermined threshold, determined by the valve solenoid, at which time the valve would open and remain on until the tachometer sensed that the rotational speed of the output shaft increased, and the error signal then decreased below the second threshold value. Since the voltage required to cause the on-off valve to open may be greater than the voltage at which the on-off valve is allowed to close, the difference being the hysteresis of the valve, significant speed variations in the output shaft may result.

To avoid difficulties resulting from the hysteresis, both in the valve and in the variable speed drive, nonlinearity, stickslip, and the response rate of the variable speed drive 15, the present invention incorporates an oscillator 35 which generates an alternating current signal to modulate the output signal from the control circuit 26. Thus, with small DC output signals, the on-off valve 30 will be controlled exclusively by the output from the oscillator 35.

The frequency of the oscillator is chosen so as to substantially exceed the normal cyclic response rate of the variable speed drive 15, but is less than the maximum response rate of the on-off valve 30. With this arrangement, the operation of the valve will not be reflected as variations in the output of the variable speed drive 15 and yet the valve can be operated intermittently and have variable periods during which it is open, depending upon the magnitude of the DC error signal.

By using an oscillator to actuate the valve intermittently, even for relatively low inertia loads, an oscillating pressure can be applied to the drive at a frequency high enough to provide a relatively constant torque to the load. Thus, even though the pressure from the on-off valve may be oscillating, its effect is an average pressure to the drive virtually eliminating the "hunting" normally encountered when using on-off control.

By superimposing an oscillatory signal on the DC error signal, the on-off valve will periodically open and close in accordance with the frequency of the oscillator even though the magnitude of the DC error signal is below the threshold voltage required to actuate the valve. As the magnitude of the DC signal rises, however, the on-off valve will remain on for longer periods of time during each cycle and therefore the average pressure applied to the piston within the variable speed drive will also increase.

The shape of the oscillator wave which modulates the DC error signal may be selected to compensate for nonlinearities in the response characteristics of the variable speed drive. For example, a triangular wave form will produce a linear pressure output for equal changes in the level of the DC error voltage. A sinusoidal oscillatory signal will result in the on-off valve remaining on for a longer period of time for an equal increase in the DC error voltage while a differentiated oscillator signal will result in less of an increase in valve on time. Thus, the shape of the oscillatory signal may be selected to compensate for nonlinear characteristics in the variable speed drive, if that result is desired.

Figure 2:
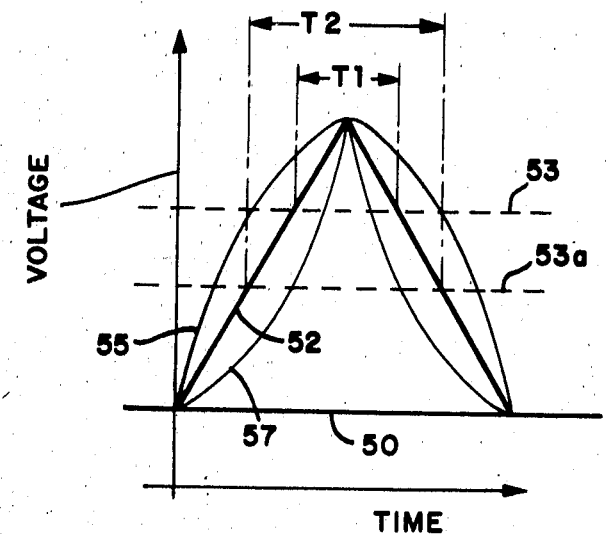
FIG. 2 is a set of typical wave forms which may be obtained from an oscillator in order to obtain the proper response characteristics from the variable speed drive.

FIG. 2 shows a set of output wave forms which might be obtained from an oscillator in order to compensate for any nonlinear characteristics of the system or to produce some other desired response. The DC error voltage is represented by the line 50 and is a function of the difference between the tachometer 25 output voltage and the reference voltage as determined by potentiometer 28. Superimposed upon the reference voltage is a triangular wave form 52. A dotted line 53 represents the threshold voltage required to actuate the on-off valve 30. It is understood, of course, that one voltage may be required to actuate the valve while the valve will close after the voltage has fallen below a second lower magnitude. For purposes of illustration, however, these voltages will be considered to be identical. Thus, the time T1 during which the valve remains open and thus supplies fluid pressure from the fluid source 31 and through the accumulator 32 and to the control piston 22 is represented in FIG. 1 as the distance between the intersections of the wave form 52 and the line 53.

If the output shaft 16 slows down, the error voltage will increase and thus the entire curve, as shown in FIG. 2, will be raised upwardly. This has the same effect as lowering the threshold of the on-off valve 30, as indicated by the dotted line 53a. Thus, on-off valve 30 will remain on for a period T2. The system will stabilize when the speed of the output shaft 16 reaches the preselected value and the on-off valve 30 remains on for a period of time sufficient to cause the proper pressure between the interfitting plates 20.

Curve 55 represents a sinusoidal output signal which, if used, would cause the on-off valve 30 to remain on for a longer period of time for equal increases in the level of the DC error voltage than if the triangular wave form 52 were used. Conversely, if the oscillator output assumed the shape shown by the curve 57, the valve on time would not increase at the same rate as the error voltage increases.

The accumulator 32, installed between the on-off valve and the fluid operated piston unit within the variable speed drive, assists in averaging the pressure pulses supplied to the piston. Therefore, the fluid system as a whole acts as if a proportional control valve were being used, but is free from the disadvantages of that type of valve, namely, its dependence on temperature, density and cleanliness of the fluid.

The variable speed drive unit described in connection with this invention is a nonlinear device wherein the torque output on the shaft 16 is a nonlinear function of the pressure applied on line 23. This is especially important when operating the variable speed drive where the shaft 16 approaches the rotational speed of the input shaft 11. Consequently, it is desirable to have a control circuit which will produce a linear response of the variable speed drive and load to error signals, and by carefully selecting the wave forms generated by the oscillator, this circumstance can be approached.

In addition to varying the magnitude of the AC component of the oscillatory wave as a function of the error voltage, this invention also contemplates varying the frequency of the oscillatory signal while maintaining constant pulse widths by, for example, a variable frequency multivibrator. The result would be to cause the on-off valve to remain on for specified constant periods of time at variable rates, depending upon the magnitude of the error signal.

It is further contemplated that a combination of the two systems described above could be employed, both varying the magnitude and the rate of the on-off signal supplied to the control valve.

Reference is now made to FIG. 3 which is an electrical schematic diagram showing one embodiment of this invention. The control unit is shown generally at 26 and derives its power from a 115 volt AC line through a full wave rectifier 37. The reference potentiometer 28 is connected across the output of the full wave rectifier 37 and its sliding contact is connected to one side of the output of rectifier circuit 40. A Zener $D_1$ provides voltage stabilization for the reference circuit.

The input to rectifier 40 is electrically connected to the tachometer 25 by leads 41. The rectifier 40 converts the alternating current signal from the tachometer to a DC voltage proportional to the rotational speed of shaft 16, which is then filtered by the capacitor C1. The difference between the DC voltage output of the tachometer and the reference voltage is then applied to a DC amplifier which includes transistors Q1 through Q6.

The oscillator circuit 35, also shown in FIG. 3, includes transistors Q7 and Q8 and supplies an oscillating output signal on line 45 to the base of transistor Q3. This oscillating output signal is therefore superimposed on the DC signal representing the difference between the reference voltage and the tachometer voltage, and this combination signal is applied to the on-off valve 30 via line 47. A diode D2 is included in this output circuit to protect it from the large transient voltages which result when current is removed suddenly from the on-off valve solenoid. The frequency of the oscillator 35 is manually controlled by potentiometer R1 while the magnitude of the output signal is determined by the setting of potentiometer R2.

The oscillator circuit shown in FIG. 3 is also dependent upon the magnitude of the error signal, to increase the frequency of the oscillator at a critical load value so that the gain of the system could be effectively increased. In other words, the system becomes more sensitive at certain load values.

The frequency of the oscillator is also a function of the voltage from potentiometer 28 and is therefore dependent upon the desired speed output from the drive. In the embodiment shown, as the desired output speed of shaft 16 approaches the speed of input shaft 11, the oscillator frequency is increased, while the pulse width is decreased, to provide a finer control over the pressure applied to the piston 22 in the drive 15.

While the embodiment described above incorporates an electronic control and oscillator circuit, it is within the scope of this invention to utilize fluid or fluidic components to realize a control circuit, oscillator and on-off valve, or any combination of the control system. Also, while the embodiment described above is a speed control device, it is within the scope of the invention to control variables other than speed, such as torque, pressure output of a pump, etc.

Thus, an improved control system for use with oil shear type variable speed drive units has been described which uses an on-off valve in combination with a control circuit and oscillator to compensate for nonlinear characteristics otherwise inherent in the system and to create desirable control characteristics. The control system employs the oscillator to actuate the control valve periodically at regular intervals for variable periods of time depending upon the magnitude of the control response required to obtain the desired output, for constant periods of time at variable intervals, or a combination of both in order to produce the same result.

While the form of apparatus herein described constitutes a preferred embodiment of the invention, it is to be understood that the invention is not limited to this precise form of apparatus, and that changes may be made therein without departing from the scope of the invention.

We claim:
1. A control circuit for effecting control of a fluid pressure operated, variable speed drive, comprising;
   a source of fluid under pressure;
   an on-off fluid control valve connected to apply fluid pressure from said source to said drive for effecting control thereof and operable upon a predetermined input;
   means responsive to the output of said drive for generating a signal,
   means generating a signal representing a desired output;
   a control circuit having its input connected to respond to the difference between said signals and its output connected to operate said fluid control valve;
   an oscillator having a period of oscillation less than the natural response time of said drive but which is greater than the maximum response time of said valve and a frequency independent of the output speed of the variable speed drive; and
   means connecting the output of said oscillator in superposition on the output of said control circuit to effect operation of said valve in accordance with said oscillator rate for time periods corresponding to that portion of the oscillator wave form which exceeds said valve predetermined input.

2. The control circuit of claim 1 further comprising means for varying the frequency of said oscillator.

3. The control circuit of claim 1 further comprising means for varying the wave form of said oscillator output.

4. The circuit of claim 1 further including an accumulator positioned between said on-off valve and said drive and wherein this period of said oscillator is less than the response time of the fluid system which includes said drive and said accumulator.

5. The control circuit of claim 1 in which said variable speed drive is of the oil shear type having a series of interfitting stator and rotor plates operated by an oil film through the speed control is effected by varying the coupling therebetween.

6. The control system for the control of the output speed of a slip type oil shear variable speed drive in which said output speed is controlled by varying the coupling between a series of interfitting plates with a fluid operated piston unit controlled from a source of fluid pressure, comprising an electrically operated on-off valve operable upon a predetermined minimum input signal and connected to such source and adapted to apply such source to said fluid piston for increasing said output speed by connecting said fluid pressure source to said piston and for decreasing said output speed by disconnecting said fluid pressure source from said piston, means for generating a signal representing said output speed, reference means forming a signal of a desired output speed, means comparing said reference and output speed signals including a DC amplifier, the output of said amplifier being connected to control said valve, an oscillator, the output frequency of which is independent of the output speed of the variable speed drive, forming a signal of alternating predetermined wave form connected to superimpose said wave form on the DC output of said amplifier and having a frequency which substantially exceeds the response rate of said drive but which is less than the maximum response rate of said valve, the amplitude of said alternating wave form being such that said valve is controlled primarily by said wave form to provide a control for said drive when said difference signal is less than said valve minimum input signal.

7. The control system of claim 6 in which the response rate of said variable speed drive is nonlinear with respect to said difference signal and where the wave form of said oscillator is nonlinear in amplitude to compensate in part for the nonlinearity of said drive response.